United States Patent Office 3,233,974
Patented Feb. 8, 1966

3,233,974
DIAGNOSTIC COMPOSITIONS
William Bradley, Paignton, England, assignor to Miles Laboratories, Inc., Elkhart, Ind., a corporation of Indiana
No Drawing. Filed Aug. 23, 1962, Ser. No. 218,868
Claims priority, application Great Britain, Aug. 28, 1961, 30,938/61
7 Claims. (Cl. 23—253)

This invention relates to the detection of glucose and more particularly to improved glucose-testing compositions and devices.

While the compositions and test devices of the present invention are useful in the determination of the glucose content of a wide variety of materials, one of the most important applications is in the detection of glucose in body fluids such as urine. The determination of glucose in urine is, of course, of importance not only to diabetic patients who must control their sugar input, but is essentially involved where large numbers of people are screened to determine the incidence of diabetes among them.

A composition has been proposed in United Kingdom specification No. 808,742 for detecting glucose in urine, which comprises glucose oxidase, peroxidase, an indicator which is oxidised by hydrogen peroxide and undergoes a colour reaction during such oxidation, for example, o-tolidine or benzidine. It is stated that the composition may also contain a buffer for maintaining the pH of the mixture between about 2 and about 8 in the presence of urine and a protein or a protein degradation product.

However, both o-tolidine and benzidine are harmful materials to handle in bulk. It has now been found according to the invention that these indicators may be replaced by other substances free from these defects and which still give satisfactory results in detecting glucose in urine.

Accordingly the present invention provides a composition for detecting glucose in urine which comprises glucose oxidase, a substance having peroxidase or peroxidase-like activity and an indicator which is oxidised by hydrogen peroxide and peroxidase and undergoes a colour reaction during such oxidation, said indicator being of the general formula:

$$R^1—X—R^2$$

where each of $R^1$ and $R^2$ is the same or different and is an aryl group or nitrogen-containing heterocyclic group having a single hydroxyl group and X is the radical $$—(CH=CH)_m—CH=(N—N)_n=CH—(CH=CH)_p—$$

where $m$ is zero or a positive integer, $p$ is zero or a positive integer and $n$ is zero or one.

Preferably the aryl group is a phenyl residue with the hydroxyl group in the p-position and which may contain other substituents such as alkoxyl groups.

The indicators may be for example 4,4'-dihydroxystilbene, 4,4'-dihydroxybenzalazine, vanillinazine, 3,3',5,5'-tetramethoxy-4,4'-dihydroxybenzalazine and 3,3'-dimethoxy-4,4'-dihydroxystilbene and bis-γ-(4-hydroxyphenyl)-acroleinazine.

The composition preferably contains a buffer for maintaining the pH of the mixture between 2 and 8 for example between about 4 and about 6 in the presence of urine and a protein or protein degradation product such as gelatin.

The enzymes used in the compositions of this invention are glucose aerodehydrogenase, sometimes known as glucose oxidase, which is capable of converting glucose to gluconic acid in the presence of atmospheric oxygen and at the same time forming hydrogen peroxide, a substance having peroxidase activity which is capable of oxidizing certain substances such as oxidisable dyes when it is present together with such dyes and hydrogen peroxide. Examples of such substances having peroxidase activity are peroxidase and catalase. Other substances which have catalytic activity such that they will cause the oxidation of oxidisable dyes in the presence of such dyes and hydrogen peroxide are exemplified by metalloporphyrins, e.g., hemin and uroferriporphyrin chloride, iodide-molybdate mixed salts such as sodium molybdate and potassium iodide mixed salts. In the place of potassium iodide and sodium molybdate other iodides such as sodium and ammonium iodides and other molybdates such as potassium and ammonium molybdates may also be used.

It has been found that other substances which exhibit catalytic activity so as to cause the oxidation of oxidisable dyes in the presence of hydrogen peroxide include normal whole blood, red blood cells alone, lyophilised whole blood and like substances.

In some instances a buffer composition may be included as above mentioned in order to keep the pH of the reactants at the site of reaction at a predetermined range.

The compositions of the present invention may be made into a suspension or a solution and used to impregnate a bibulous material such as paper or wood or other material having any desired shape or size; such a product after drying (although drying is not essential) will undergo a characteristic colour change when contacted with glucose-containing material, e.g., urine.

Alternatively, the compositions may be applied to or incorporated with splinters, sticks or strips made of, for example, wood, paper, cellulose derivatives such as cellulose acetate, glass, metal or plastic using gelatin or similar adhesive material for effecting adhesion. Such "sticks" will turn colour when moistened with a glucose-containing fluid.

The compositions may also be formed into tablets and used by applying the fluid to be tested to the tablet, e.g., placing a drop or two of suspect urine on the face of the tablet and observing the colour change if any which takes place.

The following examples illustrate the invention:

Example 1

A mixture was prepared containing:

| | | |
|---|---|---|
| Glucose oxidase | g | 9.6 |
| Peroxidase | g | 0.2 |
| Citric acid | g | 14.8 |
| Sodium citrate | g | 65.2 |
| Gelatin | g | 9.6 |
| Vanillinazine | g | 2.0 |
| Alcohol (95% ethanol) | ml | 200 |
| Water, distilled | ml | 600 | in the following manner:

(a) 9.6 g. of gelatin was added to 200 ml. of hot distilled water. The container was kept hot and stirred occasionally until the gelatin was dissolved. Prior to use the gelatin solution was liquefied and the temperature raised to 95° F.

(b) To 200 ml. of distilled water was added 14.8 g. of citric acid and 62.5 g. of sodium citrate and the mixture stirred until the solids dissolved.

(c) 2.0 g. of vanillinazine was added to 200 ml. of alcohol and stirred just prior to the final mixing. This was a crude suspension.

(d) Five to ten minutes before use the peroxidase was dissolved in 200 ml. of distilled water with stirring, the glucose oxidase was added and stirred until dissolved.

(e) Final mixing. The gelatin solution (a) was poured into a stainless steel container and the buffer solution (b) added rapidly with stirring. Next the vanillinazine suspension (c) was stirred in, the remains of the suspension was rinsed with the solution. Finally the enzyme solution (d) was added with stirring until solution was complete.

PREPARATION OF REAGENT STRIPS

The printed and die-cut strips of a filter-paper, were dipped into the impregnating solution, using racks, so that by the process of submersion and capillary attraction about ½ inch of the strip at one end was completely impregnated.

The strips were then placed in a drying tunnel or in a forced air oven immediately, and dried at 100° C.

The resulting impregnated strips containing about 2% by weight vanillinazine, when dipped into urine or a solution containing glucose, gave a violet-blue colour, the intensity and speed of development of which is roughly related to the proportion of glucose, providing inhibitors, such as gross amounts of anti-oxidants, are not present.

*Example 2*

Example 1 was repeated but using 2.0 g. of 4,4'-dihydroxystilbene instead of the 2.0 g. of vanillinazine. In this case when the imprenated strips containing about 2% by weight 4,4'-dihydroxystilbene, are dipped into urine or a solution containing glucose, they gave a bright yellow colour, the intensity and speed of development of which is roughly related to the concentration of glucose, providing inhibiting substances are not present.

In the foregoing examples the particular glucose oxidase used had an activity of about 2600 units per gram, a unit being by definition that quantity of enzyme which will cause a rate of oxygen uptake of 10 cubic mm. of oxygen at 30° C. by a solution of glucose contained in a Warburg flask. The peroxidase used was obtained from horseradish and its activity was of about the same order as that of the haemoglobin of blood.

*Example 3*

Example 1 was repeated but using 1.0 g. of vanillinazine and 1.0 g. of 3,3',5,5'-tetramethoxy-4,4'-dihydroxybenzalazine. In this case when the impregnated strips containing about 1% by weight vanillinazine and about 1% by weight 3,3',5,5'-tetramethoxy-4,4'-dihydroxybenzalzine, are dipped into urine or a solution containing glucose they gave a yellow to mauve-pink colour change.

*Example 4*

Example 1 was repeated but using 2.0 g. of bis-γ-(4-hydroxyphenyl)acroleinazine prepared in situ from p-hydroxycinnamic aldehyde and hydrazine sulphate. In this case when the impregnated strips containing about 2% by weight bis-γ-(4-hydroxyphenyl)acroleinazine, are dipped into urine or a solution containing glucose they gave a yellow to pale violet colour change.

*Example 5*

Example 3 was repeated but using 0.5 g. of 3,3',5,5'-tetramethoxy-4,4'-dihydroxybenzalazine without vanillinazine. In this case when the impregnated strips containing about 0.5% by weight 3,3',5,5'-tetramethoxy-4,4'-dihydroxybenzalazine, are dipped into urine or a solution containing glucose they gave a yellow to pink colour change.

There is a wide variability possible in the ratio of glucose oxidase and peroxidase or the substance having peroxidase-like activity which can be used in preparing the compositions of the invention: For example, the glucose oxidase content can be increased as much as one hundred times and decreased to even ⅒ of the amount described and still provide a functional testing device. And it is necessary only that there be sufficient oxidase to catalyse the oxidation of the glucose and enough substance having peroxidase or peroxidase-like activity so that it can exercise its own enzyme or enzyme-like activity.

A particularly important aspect of this invention is that it enables concentrations of hydrogen peroxide to be determined quickly and in a roughly quantitative manner. I have found that a different quantitative response to hydrogen peroxide can be achieved in two ways:

(1) By a suitable choice of substrate, whether dihydroxydiphenyl, dihydroxystilbene, dihydroxybenalazine or selected derivatives, or (2) In the case of a selected substrate, by varying the physical conditions in which it is used, for example by varying the concentrations of active ingredients, varying the pH and other suitable means.

While gelatin is a preferred proteinaceous material for producing the compositions of the present invention, other substances, including other proteins may be used, for example, dog plasma, dog serum, dried beef serum, bovine albumin and egg albumin. Casein and soluble starch (Merck) are also useful though generally to a more limited extent. And in general other soluble proteins, as well as plasma and serum can be used with some effectiveness as stabilising agents to produce a stability effect similar though ordinarily to a lesser degree than that obtained by the use of gelatin.

Examples of substitutes that may be used for (preferably with) the gelatin specified are such products as the plastic spray known as "Spraint," soluble starch (Merck) bovine albumin, gum ghatti, rubber cement, egg albumin, casein, starch glycolate, plaster of Paris, glyptal (household glue), pectin, varnish such as that known commercially as "Cenco Label Varnish," potato starch and Canada balsam.

Generally speaking, it appears that any common adhesive material which does not contain glucose would be suitable for this purpose, and particularly so if used in combination with gelatin or other proteins.

I have further found that the use of boric acid allows the compositions of the invention to be used even in the presence of ascorbic acid.

What is claimed is:

1. A composition for detecting glucose consisting essentially of
   glucose oxidase, which in the presence of oxygen and glucose forms hydrogen peroxide,
   a substance having peroxidative activity, and
   from about 0.5% to about 2.0% by weight of an indicator which is oxidized by hydrogen peroxide in the presence of said material having peroxidative activity and undergoes a color reaction during such oxidation, the indicator being of the general formula:

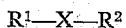
   $$R^1-X-R^2$$

wherein each of $R^1$ and $R^2$ is a member selected from the group consisting of p-hydroxy substituted phenyl residues and p-hydroxy substituted phenyl residues having methoxy substituents thereon,
   and X is the radical

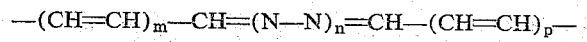
   $$-(CH=CH)_m-CH=(N-N)_n=CH-(CH=CH)_p-$$

where $m$ is a member selected from the group consisting of zero and positive integers, $p$ is a member selected from the group consisting of zero and positive integers and $n$ is a member selected from the group consisting of zero and one.

2. A composition for detecting glucose consisting essentially of
   glucose oxidase, which in the presence of oxygen and glucose forms hydrogen peroxide,
   a substance having peroxidative activity, and
   from about 0.5% to about 2.0% by weight of an indicator selected from the group consisting of vanillinazine, 4,4'-dihydroxystilbene, 4,4'-dihydroxybenzalazine, 3,3',5,5'-tetramethoxy-4,4'-dihydroxybenzalazine and 3,3'-dimethoxy-4,4'-dihydroxytsilbene, said indicator undergoing a color reaction upon being oxidized by hydrogen peroxide and said material having peroxidative activity.

3. A composition for detecting glucose consisting essentially of
glucose oxidase, which in the presence of oxygen and glucose forms hydrogen peroxide,
peroxidase, and
from about 1.0% to about 2.0% by weight of vanillinazine.
said vanillinazine undergoing a color reaction upon being oxidized by hydrogen peroxide in the presence of peroxidase.

4. A composition for detecting glucose consisting essentially of
glucose oxidase, which in the presence of oxygen and glucose forms hydrogen peroxide,
peroxidase, and
about 2.0% by weight of 4,4'-dihydroxystilbene,
said 4,4'-dihydroxystilbene undergoing a color reaction upon being oxidized by hydrogen peroxide in the presence of peroxidase.

5. Means for detecting the presence of glucose in fluids comprising, in combination, a bibulous carrier impregnated with a mixture consisting essentially of
glucose oxidase, which in the presence of oxygen and glucose forms hydrogen peroxide,
a substance having peroxidative activity, and
from about 0.5% to about 2.0% by weight of an indicator which is oxidized by hydrogen peroxide and said material having peroxidative activity and undergoes a color reaction during such oxidation,
the indicator being of the general formula:

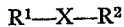

wherein each of $R^1$ and $R^2$ is a member selected from the group consisting of p-hydroxy substituted phenyl residues and p-hydroxy substituted phenyl residues having methoxy substituents thereon,
and X is the radical

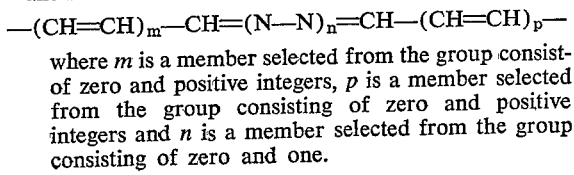

where $m$ is a member selected from the group consisting of zero and positive integers, $p$ is a member selected from the group consisting of zero and positive integers and $n$ is a member selected from the group consisting of zero and one.

6. A test indicator for detecting the presence of glucose in urine comprising, in combination, a bibulous carrier impregnated with a mixture consisting essentially of
glucose oxidase, which in the presence of oxygen and glucose forms hydrogen peroxide,
peroxidase,
from about 1.0% to about 2.0% by weight of vanillinazine,
a citric acid/sodium citrate buffer for maintaining the pH of the aforesaid mixture between about 2 and 8 in the presence of urine, and
a proteinaceous material selected from the group consisting of gelatin, dog plasma, dog serum, dried beef serum, bovine albumin and egg albumin,
said vanillinazine undergoing a color reaction upon being oxidized by hydrogen peroxide in the presence of peroxidase.

7. A test indicator for detecting the presence of glucose in urine comprising, in combination, a bibulous carrier impregnated with a mixture consisting essentially of
glucose oxidase, which in the presence of oxygen and glucose forms hydrogen peroxide,
peroxidase,
about 2.0% by weight of 4,4'-dihydroxystilbene,
a citric acid/sodium citrate buffer for maintaining the pH of the aforesaid mixture about between 2 and 8 in the presence of urine, and
a proteinaceous material selected from the group consisting of gelatin, dog plasma, dog serum, dried beef serum, bovine albumin and egg albumin,
said 4,4'-dihydroxystilbene undergoing a color reaction upon being oxidized by hydrogen peroxide in the presence of peroxidase.

References Cited by the Examiner

UNITED STATES PATENTS 2,893,844  7/1959  Cook _____ 252—408 XR
2,905,594  9/1959  Morris _____ 167—84.5 XR

OTHER REFERENCES

Journal of Organic Chemistry, 25, 841-3 (1960), or C.A. 55: 1597a.

Fresinius' Zeitschrift fur analytische Chemie, 183, 193–4 (1961).

JULIUS GREENWALD, *Primary Examiner.*